3,311,431
TEMPERATURE COMPENSATING BEARING
ASSEMBLY
Irving W. Hilliard, 20 Barnesdale Road,
Natick, Mass. 01760
Filed Aug. 7, 1964, Ser. No. 388,214
6 Claims. (Cl. 308—189)

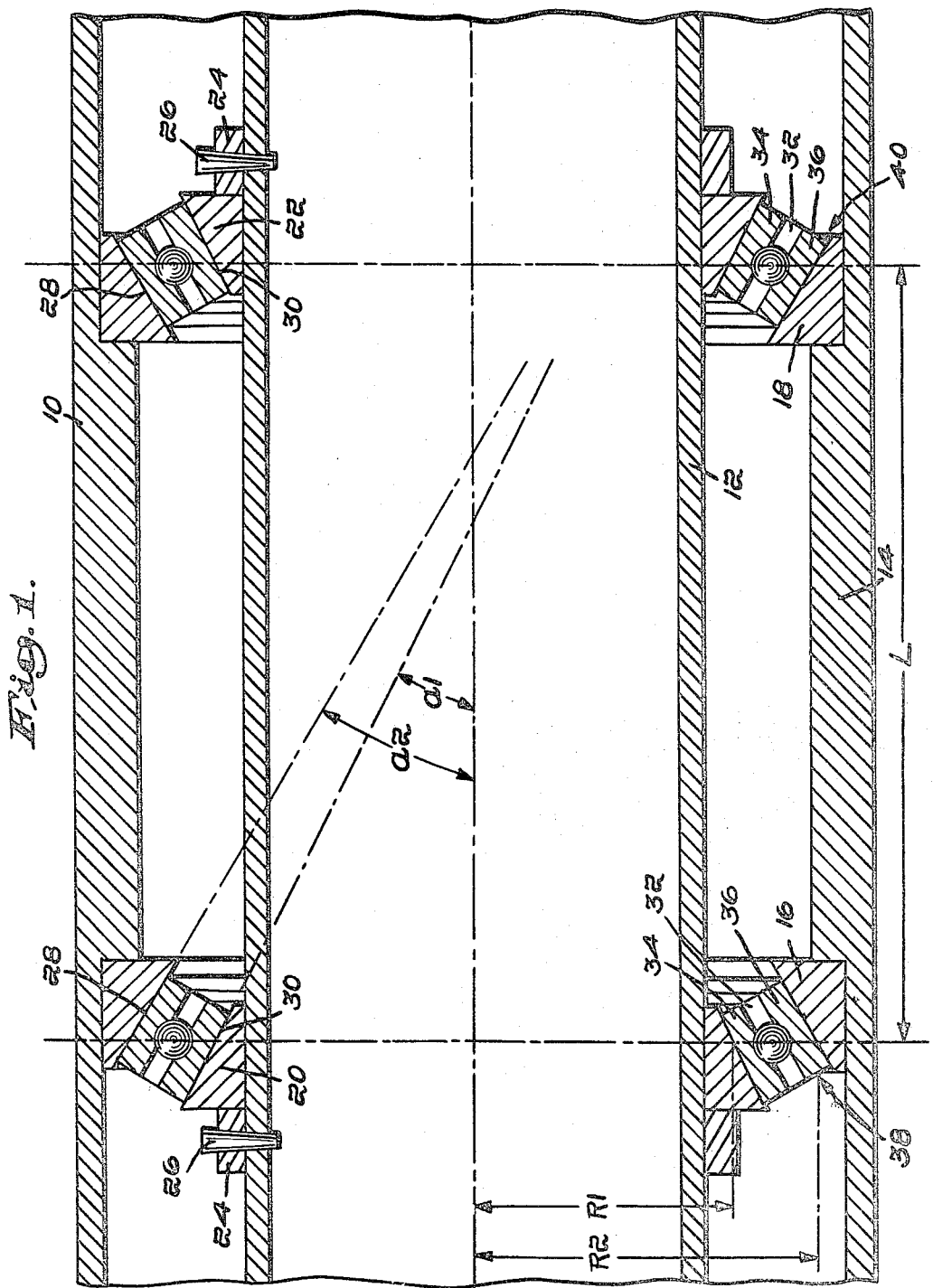

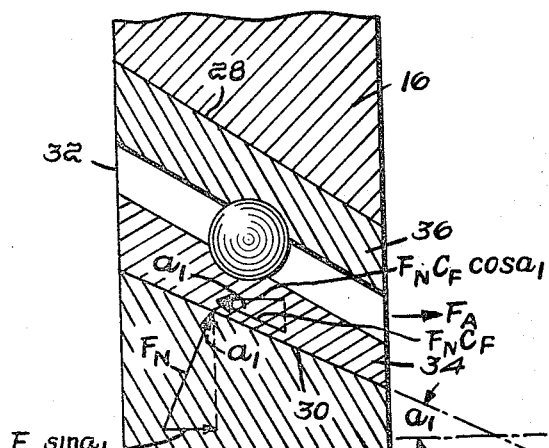
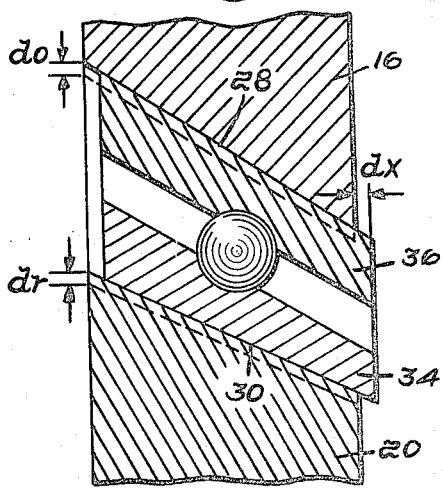
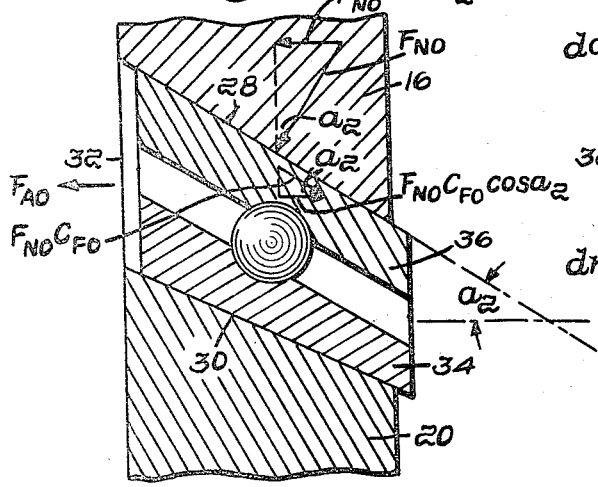
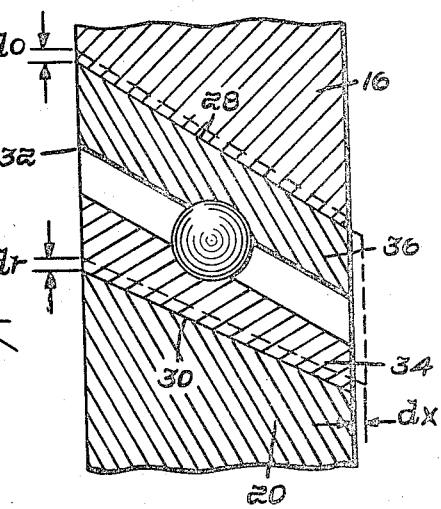
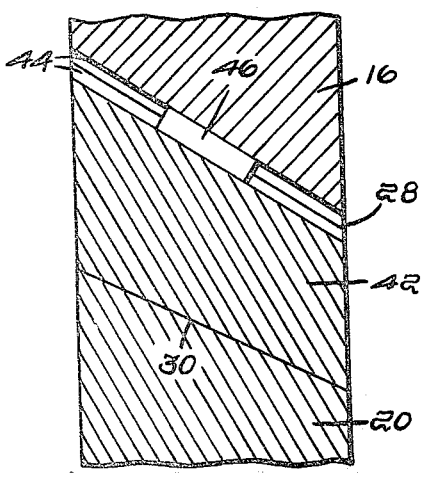

This invention relates to bearing assemblies of the type constructed of dissimilar materials and more particularly to a temperature compensating means for avoiding undersirable changes in clearances between contacting surfaces and the uncontrolled stressing of materials caused by temperature variations of the entire bearing assembly.

Under certain design conditions where the overall weight of a particular piece of apparatus is critical, it frequently becomes desirable to utilize housings and shafts constructed of lightweight material, as for example an aluminum alloy. However, since aluminum does not have particularly good wear-resistant qualities, the bearings which serve to journal the shaft within the housing must usually be fabricated of a material other than aluminum. For example, steel bearings are often positioned between the aluminum alloy shafts and housings in order to comply with the weight limitations of a particular design while also providing the necessary wear-resistant capabilities.

Although satisfactory in providing a solution to some problems in machine design such as those created by weight limitations, the aforementioned combination of different materials in a single bearing assembly has also been the source of new problems which have yet to be solved to the general satisfaction of the industry. More particularly, it is well known that different materials have different coefficients of thermal expansion. For example, the coefficient of thermal expansion of aluminum is approximately .000013 per degree Fahrenheit while that of tool steel is approximately .000007 per degree Fahrenheit. Thus it can be seen that if in a particular bearing assembly, the shaft and housing were fabricated of an aluminum alloy and the bearing of steel, any subsequent temperature variation during operation of the apparatus would naturally result in differing degrees of expansion and contraction between the bearing and its adjacent rotating and nonrotating components. More particularly, an increase in the temperature of the bearing assembly during operation of the apparatus would cause the shaft to expand to a greater degree than the bearing in contact therewith. This in turn would result in the creation of undesirable stresses in the bearing material. By the same token, expansion of the surrounding housing to a degree greater than the bearing during the same rise in the bearing assembly temperature would result in undesirable clearances developing therebetween. The opposite reaction would of course result should the temperature of the bearing assembly drop below the average design temperature. Consequently, it can be seen that the combination of different metals in a bearing assembly is the source of a serious problem centering around the differing coefficients of thermal expansion of the various metals. Some efforts are presently being made to correct these deficiencies either by adding a compliant liner between the bearing and housing or shaft or by shrinking a band of material similar to that of the bearing on the shaft or in the housing. The first method is unsatisfactory in that it introduces compliance into the system. The second method is equally unsatisfactory in that it stresses the shaft or housing material and does not correct completely for the differences in thermal coefficients of expansion.

It is therefore an outstanding object of the present invention to provide means for avoiding undesirable variations in the clearances and pressures between the various contacting surfaces of a bearing assembly utilizing dissimilar materials with different coefficients of thermal expansion.

Another object of the present invention is to provide a bearing assembly wherein no appreciable change is realized in the radial or axial clearances or pressures between components fabricated of different materials as the temperature of the bearing assembly is varied.

Another object of the present invention is to provide a bearing assembly wherein temperature characteristics may be controlled by design parameters.

A still further object of the present invention is to provide a means responsive to temperature changes in the bearing assembly capable of compensating for differing expansion and contraction rates of dissimilar materials by varying the position of the bearing relative to the adjacent rotating and nonrotating components.

Another object of the present invention is to compensate for the differing rates of expansion and contraction of the rotatable and nonrotatable components in a bearing assembly by providing a bearing having tapered radial dimensions which may be axially displaced relative to said rotating and nonrotating components in response to temperature variations in the bearing assembly.

Another object of the present invention is to provide temperature compensating means for a bearing assembly utilizing dissimilar materials without adding compliance.

A further object of the present invention is to provide a bearing assembly utilizing dissimilar materials without uncontrolled stressing of said materials.

Another object of the present invention is to provide a tapered bearing mounted between opposed nonparallel surfaces of the adjacent rotatable and nonrotatable components, the angular disposition of said surfaces being such that subsequent expansion and contraction of said components at rates differing from that of said bearing will result in a compensating axial displacement of the bearing.

A still further object of the present invention is to provide a temperature compensating bearing assembly which is inexpensive to manufacture.

These and other objects of the present invention will become more apparent as the description proceeds with the aid of the acompanying drawings in which:

FIG. 1 is a sectional view of a housing having a conventional shaft journaled for rotation therein by means of spaced bearings assemblies according to the present invention;

FIG. 2 is an enlarged sectional view of a portion of one bearing assembly with a diagrammatic illustration of the forces exerted on the bearing as the shaft cone expands at a rate greater than the inner bearing race due to the difference in coefficients of thermal expansion between these two adjacent elements;

FIG. 3 is an illustration similar to FIG. 2 showing the bearing assembly displaced axially as a result of radial forces exerted against the inner bearing race by the expanding shaft cone;

FIG. 4 is a sectional view similar to FIG. 2 with a diagrammatic illustration of the forces exerted on the bearing as the housing cone contracts at a greater rate than the outer bearing race;

FIG. 5 is an illustration similar to FIG. 3 showing the axial displacement of the bearing assembly in a reverse direction back to its original position as a result of radial forces exerted on the outer bearing race by the contracting housing cone;

FIG. 6 is a sectional view similar to FIGS. 2–5 showing the principles of the invention applied to a friction-type sleeve bearing.

Referring initially to FIG. 1 wherein are best shown general features of the invention, a cylindrical housing 10 is shown with a rotatable shaft 12 extending axially therethrough. The housing is provided with an intermediate inwardly disposed shoulder 14 separating two outer annular bearing retaining members 16 and 18 which will hereinafter be referred to as "housing cones." Rotatable shaft 12 is similarly provided with spaced annular "shaft cones" 20 and 22 held in place by means of thrust collars 24 and retaining pin members 26 extending through both the thrust collars and the shaft.

It is to be understood that the shaft 12 and housing 10 may be fabricated from the same or different materials, with the particular choice of material varying over a wide range to suit particular design requirements. For example, both the shaft and housing may be fabricated of an aluminum alloy where the total weight of the apparatus is a critical factor. However, it is to be further understood that the housing cones 16 and 18 should preferably be fabricated of either the same material or material having the same coefficient of thermal expansion as that of the housing. By the same token the same relationship should exist between the shaft cones 20 and 22 and the shaft. In this manner, any thermal expansion and contraction of the shaft and housing cones will correspond to that of the shaft and housing to which they are respectively attached. Where practical, the shaft and housing cones may be machined as integral parts of the shaft and housing, thereby reducing the total number of components in the bearing assembly.

The housing cones 16 and 18 are each provided with inclined surfaces 28 opposed by similarly inclined surfaces 30 on the opposite shaft cones 20 and 22. Surfaces 30 and 28 are nonparallel and converge inwardly at different angles (angles $a_1$ and $a_2$ in FIG. 1) towards the rotational axis of shaft 12 to provide tapered annular passageways therebetween. Annular anti-friction bearings 32 having inner and outer races 34 and 36 with angularly disposed outer faces corresponding to inclined surfaces 28 and 30 are positioned between the shaft and housing cones to complete the spaced bearing assemblies which will hereinafter be referred to by the reference numerals 38 and 40.

The interrelationship of the aforementioned bearing components will now be described with further reference to FIG. 1. The housing cones 16 and 18 do not rotate or move axially relative to housing 10 and are provided with the same coefficient of thermal expansion as that of the housing. Although the outer bearing races 36 also do not normally rotate relative to the housing cones, they must be permitted axial freedom in relation thereto and may therefore be keyed but not pinned to the housing cones. The inner and outer bearing races 34 and 36 rotate relative to each other but in the anti-friction type bearing shown in FIGS. 1–5, are not capable of translation relative to each other. In addition, the bearing races will be fabricated of the same material in order to provide a uniform coefficient of expansion for the bearing. The bearing may however be fabricated of material different from that of the shaft and housing cones in order to place emphasis on wear-resistant qualities rather than weight characteristics.

Inner bearing races 34 do not normally rotate relative to the shaft cones but as in the case of the outer bearing races, they must have axial freedom. Finally, the shaft cones 20 and 22 are fixed to the shaft for rotation therewith and are provided with the same coefficient of thermal expansion as that of the shaft.

The temperature compensating function of the bearing assemblies will now be described with particular references to FIGS. 2–5. It will be assumed for illustrative purposes that the housing 10, shaft 12 and their respective housing and shaft cones are fabricated of a material having a relatively high coefficient of thermal expansion such as aluminum and that the inner and outer races 34 and 36 of bearing 32 are fabricated of a material having a lower coefficient of thermal expansion such as steel. Moreover, since both bearing assemblies 38 and 40 are substantially identical, the description will proceed with reference only to bearing assembly 38.

As shaft 12 rotates relative to housing 10 and begins to build up speed, the overall temperature of the bearing assembly will usually rise due to the frictional resistances being overcome. (A similar result would be caused by varying environmental conditions such as a rise in the ambient air temperature.) This in turn will result in the expansion of housing 10, annular housing cone 16, shaft 12 and annular shaft cone 20 at a faster rate and to a greater degree than the inner and outer bearing races 34 and 36. This is due primarily to the difference in coefficients of expansion between steel and aluminum. When this occurs, the housing cone 16 will have a tendency to pull away from the outer bearing race 36. At the same time, shaft cone 20 will begin exerting a force on the inner race 34 of the bearing. Referring now to FIG. 2, $F_N$ represents the force exerted on the inner bearing race by the shaft cone in a direction normal to the contacting surface 30 therebetween. If no frictional resistance existed between these two components, no force could exist parallel to or along this surface. Thus, the axial force required to move the bearing ($F_N \sin a_1$) would approach zero as the frictional resistance also approached zero.

However, since in actual practice there is always frictional resistance between two contacting surfaces equal to the load multiplied by the coefficient of friction ($C_F$), the force along contacting surface 30 resisting the tendency of the bearing to slide is $F_N C_F$ and the axial component of this force is $F_N C_F \cos a_1$. Thus, the net force ($F_A$) required to move the bearing axially is $F_N \sin a_1 - F_N C_F \cos a_1$. As soon as equilibrium is reached, $F_N \sin a_1 = F_N C_F \cos a_1$.

In view of the above, it must be understood that when designing a bearing assembly according to the present invention, the angular relationship ($a_1$) of inclined contacting surface 30 to the rotational axis of shaft 12 must be arranged so that axial force $F_N \sin a_1$ is greater than the axial frictional component of the frictional resistance $F_N C_F \cos a_1$. When this is done, the bearing will slide axially in a direction as indicated in FIG. 2 under the influence of force $F_A$ as the shaft cone 20 expands relative to inner bearing race 34.

FIG. 3 is an illustration of the ultimate position attained by bearing 32 as the bearing assembly reaches its maximum operating temperature. At this point, inclined contacting surface 30 between shaft cone 20 and inner race 34 has expanded radially through a distance $d_r$ and inclined surface 28 between housing cone 16 and outer race 36 through a distance $d_o$. The radial displacement of the inner faces of both housing and shaft cones 16 and 20 has however been automatically compensated for by the axial movement of bearing 32 through a distance $d_x$ under the influence of the net axial force.

More particularly, by moving bearing 32 through an axial distance $d_x$, room has been provided for the increase in radial dimension of shaft cone 20. In this manner, any undesirable increase in radial pressure between shaft cone 20 and inner bearing race 34 is avoided while maintaining continuous contact between the two components along line 30. At the same time, any increase in clearance which would otherwise occur between housing cone 16 and outer bearing race 36 has also been avoided as continuous contact is maintained along line 28.

As the bearing assembly begins to cool, an opposite reaction will take place. More particularly, as shown in FIG. 4, housing cone 16 will begin to contact more rapidly than the outer bearing race 36. Inner housing cone 20 will also contract more rapidly than inner race 34, thereby exhibiting a tendency to increase the clearance between these two components. As housing cone 16 contracts, it will begin exerting a force $F_{NO}$ on the outer race 36 of the bearing normal to the contacting surface 28 therebetween. As shown in FIG. 4, if no frictional resistance existed between these two components, no force could exist parallel to or along this surface. Thus, the axial force required to move the bearing ($F_{NO}$ sin $a_2$) would approach zero as the frictional resistance approached zero. However, as previously noted, in actual practice there is always frictional resistance between two contacting surfaces equal to the load multiplied by the coefficient of friction which in this case will be expressed as $C_{FO}$. Consequently, the force resisting the tendency of the bearing to slide if $F_{NO}C_{FO}$ and the axial component of this force is $F_{NO}C_{FO}$ cos $a_2$. Thus, the net force $F_{AO}$ required to move the bearing back to its original position as indicated in FIG. 2 may be expressed as $F_{NO}$ sin $a_2 - F_{NO}C_{FO}$ cos $a_2$. As soon as equilibrium is reached, $F_{NO}$ sin $a_2 = F_{NO}C_{FO}$ cos $a_2$. The angular relationship ($a_2$) of inclined surface 28 to the rotational axis of shaft 12 must therefore be arranged so that the axial force $F_{NO}$ sin $a_2$ is greater than the axial frictional component $F_{NO}C_{FO}$ cos $a_2$.

As shown in FIG. 5, the bearing assembly has cooled to its original temperature. Inclined surface 30 has moved through a radial distance $d_r$ and inclined surface 28 through a radial distance $d_o$ with continuous contact with the opposed faces of the bearing 32 constantly maintained by axial displacement of the bearing in reverse direction through distance $d_x$.

FIG. 6 is an illustration of a slightly different application of the invention in connection with a sleeve-type bearing rather than the anti-friction roller type bearing illustrated in FIGS. 1–5. The bearing 42 which is in the form of a sleeve having a tapered cross section is again positioned between the inclined nonparallel contacting surfaces 28 and 30 of the housing and shaft cones 16 and 20. Opposed key ways 44 are cut into both the bearing and contacting face of the housing cone to accept a key 46 therein. The key presents rotation between the housing cone and the bearing but permits translation. The bearing is free to rotate and slide axially relative to the shaft cone 20 along contacting face 30. With this arrangement, bearing 42 may again be of material different than that of the housing and shaft cones without difficulties developing as a result of the differing coefficients of thermal expansion. Bearing 42 will simply be axially displaced relative to the shaft and housing cones in a manner similar to that previously described in connection with anti-friction bearing 32 when compensation is required.

It should now be obvious that other bearing arrangements may be adapted according to the principles of the invention for compensation in response to changes in temperature. For example, the bearing in FIG. 6 could be changed by placing key 46 and key ways 44 along contacting surface 30 rather than contacting surface 28. This would result in pure translation of the bearing relative to the shaft cone 20 along surface 30 and both translation and rotation of the bearing relative to the housing cone 16 along contacting surface 28.

In view of the above, it can now be seen that the temperature compensating function of the bearing assembly will be governed to a considerable extent by the angular relationship of the opposed inclined surfaces 28 and 30. When a condition of complete temperature compensation is assumed with the inner and outer bearing races of the same material, this relationship may be expressed mathematically as follows:

$$(R_1C_1 - R_1C_3) \cot a_1 = (R_2C_2 - R_2C_3) \cot a_2 - \frac{L}{2}(C_2 - C_1)$$

where:

(a) $R_1$ and $R_2$ are the inner and outer bearing reference radii measured in a plane perpendicular to the rotational axis of shaft 12;

(b) $a_1$ and $a_2$ are the angles formed by the inclined surfaces 28 and 30 in relation to the rotational axis of shaft 12;

(c) $C_1$, $C_2$, and $C_3$ are the respective coefficients of thermal expansion of the shaft 12, housing 10 and bearings 32; and (d) L is the linear bearing separation between reference planes.

If the shaft and housing have the same coefficients of thermal expansion, the expression simplifies to:

$$\frac{R_1}{R_2} = \frac{\cot a_2}{\cot a_1} = \frac{\tan a_1}{\tan a_2}$$

When desired, $a_1$ and $a_2$ may be adjusted for partial or over compensation.

Having thus described the construction and operation of the invention, the advantages gained from its use become more apparent. More particularly, a bearing installation of dissimilar materials which is operable over wide temperature ranges is made possible without introducing undue material stress or distortion. Moreover, the bearing assembly automatically corrects for differences in temperature coefficients of expansion by the basic design of the bearing races and shaft and housing cones rather than by introducing compliance.

This type of bearing is applicable to all classes of commerical or military equipment which must operate over wide temperature ranges and where weight considerations or possible wear considerations make it necessary or desirable to use a variety of materials for the bearing housings and shafts. It is particularly useful for large size bearings, where changes in dimensions create insurmountable problems or for small sensitive assemblies where torque must be minimized.

It is my intention to cover all changes and modifications of the invention herein chosen for purposes of disclosure which do not depart from the spirit and scope of the invention.

I claim:

1. In a bearing assembly of the type which includes an annular bearing positioned between radially spaced rotatable and non-rotatable elements, the coefficients of thermal expansion of said elements differing from that of said bearing, means responsive to changes in the temperature of said bearing assembly for maintaining contact at a relatively constant pressure per unit area between said bearing and said elements comprising: radially spaced inner and outer non-parallel surfaces on said bearing in surface-to-surface contact with adjacent non-parallel surfaces on said elements, the angular disposition of said surfaces in relation to the rotational axis of said bearing being such that radial forces exerted on the bearing as a result of said temperature changes will be resolved into forces causing axial movement of said bearing relative to said elements.

2. The apparatus as set forth in claim 1 wherein said rotatable and non-rotatable elements are comprised of materials having different coefficients of thermal expansion.

3. The apparatus as set forth in claim 1 wherein said rotatable and non-rotatable elements are comprised of a material having the same coefficients of thermal expansion.

4. The apparatus as set forth in claim 2 wherein the angular relationship of said surfaces relative to the rotational axis of said rotatable element is governed by the following mathematical expression:

$$(R_1C_1 - R_1C_3) \cot a_1 = (R_2C_2 - R_2C_3) \cot a_2 - \frac{L}{2}(C_2 - C_1)$$

where:

(a) $R_1$ and $R_2$ are inner and outer bearing reference radii measured in a plane perpendicular to the rotational axis of said rotatable element;

(b) $a_1$ and $a_2$ are the angles formed between said nonparallel surfaces and the rotational axis of said rotatable element;

(c) $C_1$, $C_2$ and $C_3$ are the respective coefficients of thermal expansion of said rotatable and non-rotatable and non-rotatable elements and said bearing; and (d) L is the linear bearing separation between reference planes.

5. The apparatus as set forth in claim 3 wherein the angular relationship of said surfaces relative to the rotational axis of said rotatable element is governed by the following mathematical expression:

$$\frac{R_1}{R_2} = \frac{\cot a_2}{\cot a_1} = \frac{\tan a_1}{\tan a_2}$$

where:
(a) $R_1$ and $R_2$ are inner and outer bearing reference radii measured in a plane perpendicular to the rotational axis of said rotatable element;
(b) $a_1$ and $a_2$ are the angles formed between said non-parallel surfaces and the rotational axis of said rotatable element.

6. In a bearing assembly of the type having a bearing positioned between rotatable and non-rotatable elements, the coefficients of thermal expansion of said elements differing from that of said bearing, means responsive to temperature variations of said bearing assembly for maintaining the desired surface pressure and contact between said bearing and said elements comprising: inner and outer radially spaced non-parallel surfaces on said bearing in face-to-face contact with adjacent non-parallel surfaces on said rotatable and non-rotatable elements, the angular disposition of said non-parallel surfaces relative to the rotational axis of said rotatable element being such that radial forces exerted on the bearing caused by said temperature variations will be resolved into axially directed forces sufficient to overcome the frictional resistance existing between said bearing and said rotatable and non-rotatable elements, the result being axial displacement of said bearing therebetween.

References Cited by the Examiner

UNITED STATES PATENTS

| | | | |
|---|---|---|---|
| 1,579,798 | 4/1926 | Vail | 308—184 |
| 3,107,950 | 10/1963 | Kleven | 308—70 |

MARTIN P. SCHWADRON, *Primary Examiner.*

FRANK SUSKO, *Examiner.*